Jan. 12, 1954 G. A. LYON 2,665,948
WHEEL COVER
Original Filed Dec. 9, 1943
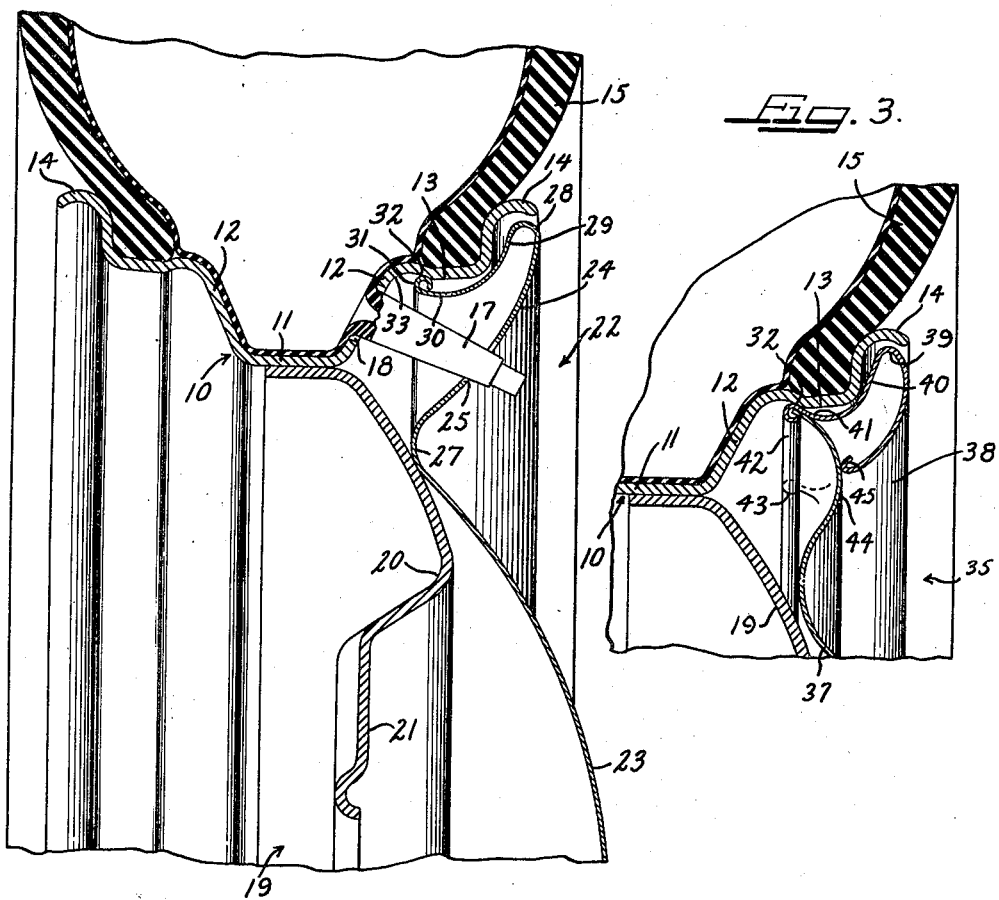
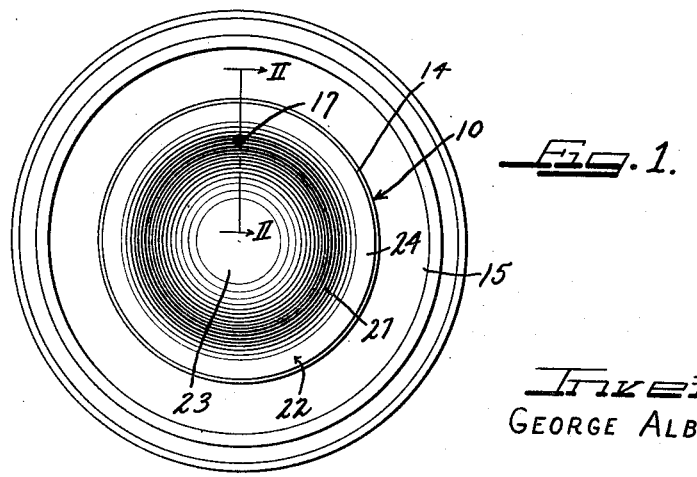
Inventor
GEORGE ALBERT LYON
by The Firm of Charles W. Hills
Attys.

Patented Jan. 12, 1954

2,665,948

UNITED STATES PATENT OFFICE 2,665,948

WHEEL COVER

George Albert Lyon, Detroit, Mich.

Original application December 9, 1943, Serial No. 513,546, now Patent No. 2,440,638, dated April 27, 1948. Divided and this application November 20, 1947, Serial No. 787,106

8 Claims. (Cl. 301—37)

This invention is directed to an improved wheel structure and more particularly relates to an improved vehicle wheel structure and cover assembly therefor.

The present application is a division of my application Serial No. 513,546 filed December 9, 1943, now Patent No. 2,440,638 issued April 27, 1948.

It is an important object of the present invention to provide an improved wheel structure and cover assembly therefor wherein the cover is in novel retaining relation to the tire rim of the wheel.

Another object of the invention is to provide for disposition over the outer side of a wheel structure a cover assembly including a part extending radially outwardly to conceal all of or a major portion of the radially outer extremity of a wheel structure and also including retaining means lying in a plane radially inwardly of the radially outer extremity of the cover, thereby to afford attachment of the cover to a radially inwardly disposed flange of the tire rim.

In accordance with the general features of the present invention there is provided in a wheel structure including a multi-flanged tire rim and a load sustaining body part, the tire rim including an intermediate generally axially extending flange having a formation providing at the radially inner side thereof a generally axially inwardly directed cover retaining shoulder, a cover including a portion in substantially concealing relation to the tire rim and a portion extending into concealing relation to the wheel body, said tire rim concealing portion having a turned under generally radially inwardly and axially inwardly extending attachment flange including a generally radially outwardly protruding terminal formation affording a resilient bead structure engaging said shoulder in retaining snap-on, pry-off relation.

According to other general features of the invention there is provided a wheel structure including a tire rim of the drop center type having flanges including an edge portion extending generally axially outwardly at the radially outer extremity of the wheel and a central load bearing portion secured centrally of said tire rim, one of the flanges of the tire rim comprising an intermediate flange extending generally axially and having a generally axially inwardly facing cover retaining shoulder formation thereon at the radially inner side thereof, the cover assembly including a circular cover member having a radially outer portion arranged to extend from the vicinity of the edge portion of the tire rim radially inwardly to a point radially inwardly of the junction between the tire rim and the central load bearing portion, thereby to conceal the side flanges of the tire rim and the radially outer part of the body portion, said cover assembly also including at the radially outer portion thereof, an axially inwardly disposed, radially inwardly extending flange member terminating in an axially inwardly extending flange including a radially outwardly turned bead engaging said shoulder formation in detachable, snap-on, pry-off engagement.

According to other features of the invention the cover is formed entirely from synthetic plastic material including the attachment flange portion thereof and the retaining bead thereon.

According to other general features of the invention there is provided in a wheel structure including a tire rim and a central load bearing portion, the tire rim having a generally axially outwardly extending, radially inwardly curved edge portion, a cover assembly including a radially outwardly extending portion, the radially outer marginal border thereof including a part bent back upon said marginal part to form a radially outwardly extending, elongated bead of a circular dimension enabling it to fit within the radially inner curved surface of the edge portion of the tire rim, said bent back portion terminating in a generally axially inwardly extending flange arranged for snap-on, detachable engagement with a portion of the wheel structure to maintain the cover over the outer side thereof.

Other objects, features and advantages of the present invention will become readily apparent from the following detailed description of certain preferred embodiments thereof taken in conjunction with the accompanying drawings, in which:

Figure 1 is a side elevational view of a wheel structure and cover assembly embodying one form of my invention;

Figure 2 is an enlarged fragmentary cross sectional view taken substantially on the line II—II of Figure 1; and Figure 3 is an enlarged, fragmentary cross sectional view of a modified form of the invention.

As shown on the drawings:

In both forms of my invention the wheel disclosed is of the same construction and, accordingly, similar reference numerals identify similar parts.

The wheel includes a tire rim 10 having a base flange 11, side flanges 12, intermediate generally axially extending flanges 13 and terminal flanges 14 of generally curved cross section. The tire rim is thus of the popular drop center type adapted to support a pneumatic tire and tube assembly 15, the tube having a valve stem 17 which projects through an appropriate aperture 18 in the outer side flange 12 of the tire rim.

A central load bearing portion 19 is of the disk spider type and is secured to the base flange 11 of the tire rim in any preferred manner as by welding or riveting, or the like. The wheel body 19 has an annular intermediate generally axially outwardly extending reinforcing nose bulge 20 which defines a central bolt-on flange 21 by which the wheel may be secured to an appropriate part of the vehicle such as the brake drum or axle or the like (not shown).

In the construction of Figures 1 and 2, a cover 22 is provided which is of circular disk form and made from a thin sheet material which may, if desired, be a sheet synthetic plastic material characterized by resilient deflectability whereby it is adapted to be locally, temporarily, resiliently flexed and yet is self-sustaining as to form and will immediately snap back into its initial configuration when distorting pressures are relieved therefrom.

The cover 22 includes a central crowned portion 23 which generally simulates a central circular hub cap member and which merges integrally in one piece with a radially outer portion 24, the latter being provided with an aperture 25 through which the valve stem 17 extends to be accessible for inflation of the tire 15.

The outer cover portion 24 is of a cross-sectional configuration and expanse such that it extends from the edge portion or terminal flange 14 of the tire rim radially inwardly to a point beyond the junction of the tire rim and the central load bearing body portion 19 of the wheel.

Where the central and outer portions 23 and 24, respectively, of the cover merge, a circular, axially inwardly indented part 27 extends axially inwardly sufficiently far to engage the adjacent portion of the outer surface of the central load bearing portion 19 of the wheel, and more particularly at the radially outer side of the nose bulge 20 thereof, and thereby serves as an intermediate support for the cover. It will also be observed that the juncture portion 27 provides an axially inwardly extending annular rib which serves to rigidify the juncture.

Furthermore, the cross sectional configuration of the cover portion 24 is such that it generally simulates the curvature of the side wall of the tire 15, thereby to give the appearance of being a continuation thereof and to appear as a part thereof, and also to appear as a side wall of a massive tire mounted on a wheel of minimum dimensions when such portion of the cover is colored white. For retaining the cover 22 upon the wheel, the outer margin of the outer cover portion 24 is turned back upon itself as at 28 to provide a generally radially inwardly extending flange 29 which merges on a gradualy radially and axially inwardly curving juncture with a generaly axially inwardly extending flange 30 which terminates in a generally radially outwardly curved or turned back bead 31 which projects radially outwardly from the edge of the flange 30. Furthermore, the flange portion 30 extends to a diameter which is smaller than the diameter of the radially inner side of the intermediate flange 13 of the tire rim so as to clear the same. However the bead 31 extends to a diameter which is at least slightly greater than the inner diameter of the flange 13, or more particularly, a generally axially inwardly facing retaining shoulder 32 on the flange 13. Herein the shoulder 32 is formed by a groove 33 which is located at the juncture of the side wall flange 12 and the intermediate flange 13 and which groove opens radially inwardly, the shoulder 32 being the axially outer side defining the groove.

The curved juncture 28 of the cover portion 24 and the flange 29, it will be seen in Figure 2, constitutes the radially outer extremity of the visible portion of the cover and is disposed adjacent the extremity of the terminal flange 14 of the tire rim so that the cover effectively conceals the tire rim 10, together with the central load bearing portion 19 of the wheel.

In applying the cover to the wheel, it is pressed axially inwardly in concentric relation over the wheel structure, the retaining bead 31 passing inwardly over the radially inner surface of the intermediate flange 13, until the bead snaps behind the retaining shoulder 32. In this relationship, the juncture rib portion 27 of the cover is also brought into abutment with the central load bearing body portion 19 of the wheel. When the parts are so related it will be seen that the intermediate portion of the cover is securely supported against the wheel and that the radially outer extremity of the cover which is disposed slightly radially inwardly of the tire rim flange extremity 14 is what may be referred to as floatingly mounted while the outer portion 24 of the cover is nevertheless securely maintained on the wheel in detachable relation thereto by the interengagement of the bead 31 and the shoulder 32.

If the vehicle with which the wheel is associated should be run against a curb or other obstruction, and the central portion 23 of the cover is engaged thereby, such portion will dent inwardly temporarily and the distortion will immediately snap back into initial configuration when the distorting pressure is relieved therefrom. Should the radially outer extremity of the cover be engaged by the curb or other obstruction, it will spring inwardly until it is within the confines of the edge flange 14 and be thus protected against further distortion. Where the cover is constructed from synthetic plastic and is given a solid color throughout the depth or thickness thereof, it will be seen that discoloration and disfiguration from abrasion will not result in a contrasting under color being revealed.

When it is desired to remove the cover 22, a suitable pry-off tool such as a screw driver inserted behind the curved extremity portion 28 of the cover will be effective to draw such portion outwardly. Where the cover is made from flexible resilient plastic material, this causes the extremity portion of the cover 24 to be deflected outwardly so that it can be grasped manually and drawn axially outwardly to withdraw the bead 31 from engagement with the shoulder 32, thus releasing the cover from the wheel.

In the modified construction of Figure 3, the wheel is provided with a cover 35 formed as a two part assembly including an inner circular portion 37 and an outer circular portion 38. The inner portion 37 may be formed from suitable sheet material such as a synthetic plastic, while the outer portion 38 may be formed from a relatively more rigid and deflection resistant material such as stainless steel and providing a protective, bordering, rigidifying annulus about the periphery of the inner cover 37.

In this modified construction, the annulus 38 comprises a bead-like structure of generally convex outer formation which extends radially to a curved radially outer junction 39 merging with a generally radially inwardly extending underturned flange section 40 which in turn merges on a generally radially and axially inward curve with a generally axially inwardly extending flange portion 41 which is turned at its extremity generally radially outwardly and is curled upon itself generally radially inwardly to provide a rigidifying bead 42. Through this arrangement, the radially outer side of the bead 42 is adapted for snap-on, pry-off engagement with the shoulder 32 of the intermediate flange of the tire rim. In order to render the bead 42 resiliently deflectable for passing the axially outer portion of the tire rim flange 13 into engagement with the shoulder 32, it is preferably split at circumferentially spaced points as shown at 43.

In the present instance, the radially outer extremity of the inner cover portion 37 is preferably turned generally axially rearwardly and into face-to-face abutment with the flange 41 of the outer bordering annulus 38 and with the extremity of the margin or edge engaged retainingly within the bead 42. Further, the cover portion 37 is formed with a generally axially outwardly bulging annular rib 44 adjacent the extremity and which rib is engaged by an underturned finishing bead 45 at the radially inner margin of the bordering annulus 38.

In applying the cover assembly 35 to the wheel, the radially outwardly projecting bead extremity portion 32 is slid axially inwardly along the tire rim intermediate flange 13 and since the bead is of somewhat greater outer diameter than the diameter of the circle described by the flange 13, axially inward pressure on the cover at the bordering annulus 38 causes the bead 42 and the flange 41 to be slightly compressed radially inwardly and after the bead passes the shoulder 32, the bead springs outwardly into the desired retaining engagement.

When it is desired to remove the cover 35 from the wheel, a pry-off tool inserted behind the radial extremity juncture portion 39 and manipulated by fulcruming it against the terminal flange 14 causes the bead 42 to resiliently contract and leave the shoulder 32, thus releasing the cover from the wheel.

From the foregoing it will be apparent that there is provided herein, in both forms of the invention, an improved cover having an intermediate part which extends in concealing relation to the wheel body and an outer extremity portion which substantially conceals the radially outer part of the wheel, that is the tire rim, and has a retaining portion bent back upon itself at the outer extremity of the cover and extending radially and axially inwardly for convenient and easy snap-on, detachable association with the generally axially extending intermediate flange of the tire rim.

I claim as my invention:

1. In a wheel structure including a multi-flanged tire rim and a load sustaining body part, the tire rim including an intermediate generally axially extending flange having a formation providing at the radially inner side thereof a generally axially inwardly directed cover retaining shoulder and a generally curved terminal flange, a cover including a portion in substantially concealing relation to the tire rim and a portion extending into concealing relation to the wheel body, said tire rim concealing portion having a turned-under generally radially inwardly and axially inwardly extending resilient attachment flange of smaller diameter than said intermediate flange of the tire rim and disposed in substantially uniformly radially inwardly spaced relation thereto, said attachment flange including a generally radially outwardly protruding terminal formation affording a resilient bead structure engaging said shoulder in retaining snap-on, pry-off relation and maintaining the remainder of the attachment flange spaced from said intermediate flange to afford a substantially radially floating relationship of the outer margin of the cover to the tire rim except where the terminal resilient bead engages the tire rim shoulder, the radially outer extremity of the tire rim concealing cover portion having a diameter substantially greater than that of said tire rim intermediate flange, and said cover radially outer extremity being disposed adjacent the extremity of the tire rim terminal flange and extending in floating relation thereto upon assembly of the cover with said tire rim.

2. In a wheel structure including a multi-flanged tire rim and a wheel body, the tire rim having a generally axially extending intermediate flange including adjacent its axially inner margin means affording a generally radially and axially inwardly facing retaining shoulder; a one-piece cover member formed from sheet material and comprising an annular portion bearing at the radially inner part thereof against the wheel body and extending from the wheel body generally radially and axially outwardly into substantially concealing relation to the tire rim, the radially outer margin of said cover member having an underturned resilient flange concealed behind said annular portion spaced from the tire rim and including an inner terminal retaining bead projecting generally radially outwardly and engaging said shoulders to retain the cover on the wheel, the part of the cover engaging the wheel body maintaining generally axially outward pressure of said of said bead against said groove shoulder, whereby to hold the bead in cover retaining engagement with said shoulder.

3. In a wheel structure including a tire rim and a wheel body, the tire rim having an intermediate generally axially extending flange formed adjacent the base thereof with means providing a generally axially and radially inwardly facing shoulder, and a generally curved terminal flange at the axially outer side of the intermediate flange, a cover member having a convex annular portion facing axially outwardly and dimensioned to fit within and in closely spaced floating relation to the extremity of the terminal flange of the tire rim, said cover member having an underturned generally radially inwardly and axially inwardly extending resilient extending to said shoulder and of smaller diameter than said intermediate flange, the inner terminal portion of said cover flange being turned generally radially outwardly and having a rounded formation retainingly engaging said shoulder and maintaining said cover flange in uniformly spaced relation to said tire rim intermediate flange.

4. In a wheel structure, including a tire rim and a wheel body, the tire rim having an intermediate generally axially extending flange formed adjacent the base thereof with means providing a generally axially and radially inwardly facing shoulder and a generally curved terminal flange, a cover member having a radially, outermost generally U-shaped portion having its apex extending in close floating relation to the extremity of said tire rim terminal flange and opening generally radially and axially inwardly, said U-shaped portion including an axially outer convex annular leg portion extending from said apex and facing axially outwardly and an underturned axially inner resilient annular leg portion extending from said apex radially and axially inwardly in radially inwardly floating relation to said tire rim intermediate flange, the inner terminal portion of said axially inner annular leg portion having a rounded formation for retainingly engaging said shoulder and maintaining said U-shaped portion in floating relation to said tire rim.

5. In a wheel structure including a tire rim and a wheel body, the tire rim having an intermediate generally axially extending flange formed adjacent the base thereof with means providing a generally axially and radially inwardly facing shoulder, and a generally curved terminal flange at the axially outer side of the intermediate flange, a cover member having a convex annular portion facing axially outwardly and dimensioned to fit within and in closely spaced floating relation to the extremity of the terminal flange of the tire rim, said cover member having an underturned generally radially inwardly and axially inwardly extending resilient flange extending to said shoulder and of smaller diameter than said intermediate flange, the inner terminal portion of said cover flange being turned generally radially outwardly and having a rounded formation retainingly engaging said shoulder and maintaining said cover flange in uniformly spaced relation to said tire rim intermediate flange, said rounded formation comprising a continuous annular bead split at circumferentially spaced points to improve the resilient deflectability thereof.

6. In a wheel structure including a tire rim and a wheel body, the tire rim having an intermediate generally axially extending flange formed adjacent the base thereof with means providing a generally axially and radially inwardly facing shoulder, and a generally curved terminal flange at the axially outer side of the intermediate flange, a cover member having a convex annular portion facing axially outwardly and dimensioned to fit within and in closely spaced floating relation to the extremity of the terminal flange of the tire rim, said cover member having an underturned generally radially inwardly and axially inwardly extending resilient flange extending to said shoulder and of smaller diameter than said intermediate flange, the inner terminal portion of said cover flange being turned generally radially outwardly and having a rounded formation retainingly engaging said shoulder and maintaining said cover flange in uniformly spaced relation to said tire rim intermediate flange, said rounded formation comprising a generally radially inwardly turned bead, and a second cover member having a radially outer extremity retainingly engaged within said bead.

7. In a wheel structure including a tire rim and a wheel body, the tire rim having an intermediate generally axially extending flange formed adjacent the base thereof with means providing a generally axially and radially inwardly facing shoulder, and a generally curved terminal flange at the axially outer side of the intermediate flange, a cover member having a convex annular portion facing axially outwardly and dimensioned to fit within and in closely spaced floating relation to the extremity of the terminal flange of the tire rim, said cover member having an underturned generally radially inwardly and axially inwardly extending resilient flange extending to said shoulder and of smaller diameter than said intermediate flange, the inner terminal portion of said cover flange being turned generally radially outwardly and having a rounded formation retainingly engaging said shoulder and maintaining said cover flange in uniformly spaced relation to said tire rim intermediate flange, said rounded formation comprising a generally radially inwardly turned bead, and a second cover member having a radially outer extremity retainingly engaged within said bead, said convex annular portion having an inner marginal formation seated against the second cover member.

8. In a wheel structure including a tire rim and a wheel body, the tire rim having an intermediate generally axially extending flange formed adjacent the base thereof with means providing a generally axially and radially inwardly facing shoulder, and a generally curved terminal flange at the axially outer side of the intermediate flange, a cover member having a convex annular portion facing axially outwardly and dimensioned to fit within and in closely spaced floating relation to the extremity of the terminal flange of the tire rim, said cover member having an underturned generally radially inwardly and axially inwardly extending resilient flange extending to said shoulder and of smaller diameter than said intermediate flange, the inner terminal portion of said cover flange being turned generally radially outwardly and having a rounded formation retainingly engaging said shoulder and maintaining said cover flange in uniformly spaced relation to said tire rim intermediate flange, said rounded formation comprising a generally radially inwardly turned bead, and a second cover member having a radially outer extremity retainingly engaged within said bead, said second cover member having an annular generally axially outwardly bulging rib formation engaging said inner marginal formation.

GEORGE ALBERT LYON.

References Cited in the file of this patent

UNITED STATES PATENTS

| Number | Name | Date |
| --- | --- | --- |
| Re. 22,042 | Lyon | Mar. 3, 1942 |
| 2,005,626 | Maranville | June 18, 1935 |
| 2,157,136 | Lyon | May 9, 1939 |
| 2,244,014 | Lyon | June 3, 1941 |
| 2,279,334 | Lyon | Apr. 14, 1942 |
| 2,368,228 | Lyon | Jan. 30, 1945 |
| 2,440,638 | Lyon | Apr. 27, 1948 |